(12) United States Patent
Anderson (10) Patent No.: US 11,868,754 B2
(45) Date of Patent: Jan. 9, 2024

(54) SYSTEMS AND METHODS FOR EDGE DEVICE MANAGEMENT

(71) Applicant: Sensia LLC, Houston, TX (US)

(72) Inventor: Jeffery P. Anderson, Beaumont (CA)

(73) Assignee: Sensia LLC, Houston, TX (US)

( * ) Notice: Subject to any disclaimer, the term of this patent is extended or adjusted under 35 U.S.C. 154(b) by 0 days.

(21) Appl. No.: 17/377,711

(22) Filed: Jul. 16, 2021

(65) Prior Publication Data

US 2022/0019422 A1 Jan. 20, 2022

Related U.S. Application Data

(60) Provisional application No. 63/053,381, filed on Jul. 17, 2020, provisional application No. 63/053,441, filed on Jul. 17, 2020.

(51) Int. Cl.
| | |
|---|---|
| *G06F 8/65* | (2018.01) |
| *G06F 8/61* | (2018.01) |
| *H04L 67/00* | (2022.01) |
| *G06N 20/00* | (2019.01) |
| *G06F 9/54* | (2006.01) |

(52) U.S. Cl.
CPC ............... *G06F 8/65* (2013.01); *G06F 8/62* (2013.01); *G06F 9/541* (2013.01); *G06N 20/00* (2019.01); *H04L 67/34* (2013.01)

(58) Field of Classification Search
CPC . G06F 8/65; G06F 8/70; G06F 9/5072; G06F 9/5044
See application file for complete search history.

(56) References Cited

U.S. PATENT DOCUMENTS

| | | |
|---|---|---|
| 9,271,110 B1 | 2/2016 | Fultz et al. |
| 2003/0074139 A1 | 4/2003 | Poedjono |
| 2006/0130037 A1* | 6/2006 | Mackay ................. G06F 8/658 717/168 |
| 2009/0062929 A1 | 3/2009 | Takahashi |
| 2011/0107322 A1* | 5/2011 | Hashiguchi ............. G06F 8/65 717/170 |
| 2012/0075059 A1 | 3/2012 | Fyke et al. |
| 2013/0024542 A1 | 1/2013 | Keller et al. |
| 2013/0252583 A1 | 9/2013 | Brown et al. |
| 2017/0293896 A1 | 10/2017 | Katayama et al. |
| 2017/0311368 A1 | 10/2017 | Kandur Raja et al. |
| 2018/0373781 A1 | 12/2018 | Palrecha |
| 2018/0375953 A1 | 12/2018 | Casassa Mont et al. |
| 2019/0034735 A1 | 1/2019 | Cuban et al. |
| 2019/0052638 A1 | 2/2019 | Agarwal et al. |

(Continued)

*Primary Examiner* — Duy Khuong T Nguyen
(74) *Attorney, Agent, or Firm* — Foley & Lardner LLP (57) ABSTRACT

An edge device management system comprising a plurality of edge devices is shown. Each device includes a processing circuit configured to provide, via a first edge device of the plurality of edge devices, remote upgrades for an application of a second edge device of the plurality of edge devices. The processing circuit is configured to control hardware security features of the second edge device. The processing circuit is configured to configure a software update package for the second edge device, the software update package comprising a plurality of different software updates. The processing circuit is configured to deploy one or more deployment management tools to manage the application on the second edge device.

17 Claims, 7 Drawing Sheets

(56) References Cited

U.S. PATENT DOCUMENTS

| | | |
|---|---|---|
| 2019/0244129 A1 | 8/2019 | Tabuchi |
| 2020/0182036 A1 | 6/2020 | Rangarajan et al. |
| 2021/0144517 A1* | 5/2021 | Guim Bernat ...... G06F 11/3006 |
| 2021/0409478 A1* | 12/2021 | Choi ....................... H04L 67/63 |

* cited by examiner

SYSTEMS AND METHODS FOR EDGE DEVICE MANAGEMENT

CROSS-REFERENCE TO RELATED APPLICATION

This application claims priority from U.S. Provisional Application No. 63/053,381, filed Jul. 17, 2020, and U.S. Provisional Application No. 63/053,441, filed Jul. 17, 2020, the entire disclosures of which are incorporated by reference herein in their entireties.

BACKGROUND

As the industrial edge computing grows in both scale and complexity the legacy approaches and infrastructure present challenges to growth and security. Historically, "over the air" firmware and software upgrades relied on custom software and tended to be complex applications and often monolithic, such that an edge device would have the entirety of its software upgraded in a single, often high-risk operation. The health and state of the devices is often monitored in some basic manner so that communication device signal strength, software/firmware version, and last "check-in" or communication can be tracked by system administrators on some kind of dashboard. For industrial devices, this typically required custom health-metric collection logic to be written on a per-device basis.

Security of the device was often achieved through "security by obscurity", with minimal protections from a local malicious actor, and malicious payloads could be deployed without detection and potentially sensitive data, such as logged measurements or application algorithms could be retrieved with relative ease. Legacy systems tend to gravitate towards specific products that perform specific roles, making it easier/feasible to manage the population at scale. For example, thousands of devices may be managed remotely, but they will have the same firmware or software, a common configuration that may turn features off or on, but ultimately tend to behave as an "appliance" with a well-defined set of functionalities and predictable behavior. If new features, capabilities, or customized logic are required, this would typically require the release of a new software or firmware version and an upgrade "campaign" that provides this to the consumers.

There exists a need for a more complex device management solution. This is in part due to the fact that industrial edge computing needs to mature to be part of the Internet of Things/"Industry 4.0" push seen in multiple industries (e.g., oil and gas industries, etc.). Modern expectations around security require tools that help manage credentials and identities for devices, authorized users (or other devices), and even applications.

As software continues to grow in size and complexity (Wirth's Law) it becomes impractical to push monolithic bundles for each update. Customer expectations around agile solutions to problems necessitate faster turnaround and the a more complex device management solution can address these needs with intelligent package and dependency management and technologies such as containerization that allow for both incremental deployments and sandboxed applications that must operate within controlled resource constraints (e.g. one rogue application with a bug cannot consume all available memory). Comprehensive "instrumentation" of the edge devices physical properties, state, and the applications improves overall service quality to the end user.

SUMMARY

This summary is illustrative only and is not intended to be in any way limiting. Other aspects, inventive features, and advantages of the devices or processes described herein will become apparent in the detailed description set forth herein, taken in conjunction with the accompanying figures, wherein like reference numerals refer to like elements.

One implementation of the present disclosure is an edge device management system including a plurality of edge devices is shown. Each device includes a processing circuit configured to provide, via a first edge device of the plurality of edge devices, remote upgrades for an application of a second edge device of the plurality of edge devices. The processing circuit is configured to control hardware security features of the second edge device. The processing circuit is configured to configure a software update package for the second edge device, the software update package including a plurality of different software updates. The processing circuit is configured to deploy one or more deployment management tools to manage the application on the second edge device.

In some embodiments, providing the remote upgrades for the application includes providing the remote upgrades to at least one of a basic input/output system (BIOS), a boot loader, an operating system (OS), a software application or a system kernel.

In some embodiments, providing the remote upgrades for the application includes providing reliability features including at least one of retries, fail-over strategies, encrypting, signing checking, or integrity checking.

In some embodiments, deploying the one or more deployment management tools to manage the application includes deploying the application on the second edge device or removing the application on the second edge device.

In some embodiments, providing the remote upgrades for the application includes providing point-to-point (P2P) updates by enabling a local caching of update packages and providing an indication of availability to the plurality of edge devices.

In some embodiments, the processing circuit is further configured to receive instructions from a user interface adjust the software update package on an instance-by-instance basis based on the received instructions.

In some embodiments, the processing circuit is further configured to detect, via at least one of the plurality of edge devices, abnormal behavior of the second edge device of the plurality of edge devices using machine learning techniques, identify, via the first edge device, one or more device requirements of the second edge device, and integrate, via the first edge device, integration of one or more applications on the second edge device with other applications in the plurality of edge devices via one or more application programming interfaces (APIs).

Another implementation of the present disclosure is a method for managing edge devices. The method includes providing, via a first edge device of the plurality of edge devices, remote upgrades for an application of a second edge device of the plurality of edge devices. The method further includes controlling, via the first edge device, hardware security features of the second edge device. The method further includes configuring, via the first edge device, a software update package for the second edge device, the software update package including a plurality of different software updates. The method further includes deploying, via the first edge device, one or more deployment management tools to manage the application on the second edge device.

In some embodiments, providing the remote upgrades for the application includes providing the remote upgrades to at least one of a basic input/output system (BIOS), a boot loader, an operating system (OS), a software application, or a system kernel.

In some embodiments, providing the remote upgrades for the application includes providing reliability features including at least one of retries, fail-over strategies, encrypting, signing checking, or integrity checking.

In some embodiments, deploying the one or more deployment management tools to manage the application includes deploying the application on the second edge device or removing the application on the second edge device.

In some embodiments, providing the remote upgrades for the application includes providing point-to-point (P2P) updates by enabling a local caching of update packages and providing an indication of availability to the plurality of edge devices.

In some embodiments, the method further includes receiving instructions from a user interface and adjusting the software update package on an instance-by-instance basis based on the received instructions.

In some embodiments, the method further includes detecting, via at least one of the plurality of edge devices, abnormal behavior of the second edge device of the plurality of edge devices using machine learning techniques, identifying, via the first edge device, one or more device requirements of the second edge device, and integrating, via the first edge device, integration of one or more applications on the second edge device with other applications in the plurality of edge devices via one or more application programming interfaces (APIs).

Another implementation of the present disclosure is a computer readable media for managing a plurality of edge devices including a processing circuit including a processor and a memory, the memory storing instructions that, when executed by the processor, cause the media to perform automatic operations. The operations include providing, via a first edge device of the plurality of edge devices, remote upgrades for an application of a second edge device of the plurality of edge devices. The operations include controlling, via the first edge device, hardware security features of the second edge device. The operations include configuring, via the first edge device, a software update package for the second edge device, the software update package including a plurality of different software updates. The operations include deploying, via the first edge device, one or more deployment management tools to manage the application on the second edge device.

In some embodiments, providing the remote upgrades for the application including providing the remote upgrades to at least one of a basic input/output system (BIOS), a boot loader, an operating system (OS), a software application, or a system kernel.

In some embodiments, providing the remote upgrades for the application includes providing reliability features including at least one of retries, fail-over strategies, encrypting, signing validation, or integrity validation.

In some embodiments, deploying the one or more deployment management tools to manage the application includes deploying the application on the second edge device or removing the application on the second edge device.

In some embodiments, providing the remote upgrades for the application includes providing point-to-point (P2P) updates by enabling a local caching of update packages and providing an indication of availability to the plurality of edge devices.

In some embodiments, the processing circuit is further configured to receive instructions from a user interface and adjust the software update package on an instance-by-instance basis based on the received instructions.

DETAILED DESCRIPTION

Overview

Before turning to the FIGURES, which illustrate certain exemplary embodiments in detail, it should be understood that the present disclosure is not limited to the details or methodology set forth in the description or illustrated in the FIGURES. It should also be understood that the terminology used herein is for the purpose of description only and should not be regarded as limiting.

Referring generally to the FIGURES, systems and methods for optimizing edge device management is shown, according to exemplary embodiments. In some embodiments, an edge device management system can implement various services and/or instructions for optimizing management of one or more edge devices. In some embodiments, these services include remote upgrades, heath and state data collecting, security, device-based configurations, deployment campaign tools, interface capabilities, anomaly detection tools, and identification managing tools.

System Overview

Hydrocarbon Site

Figure 1:
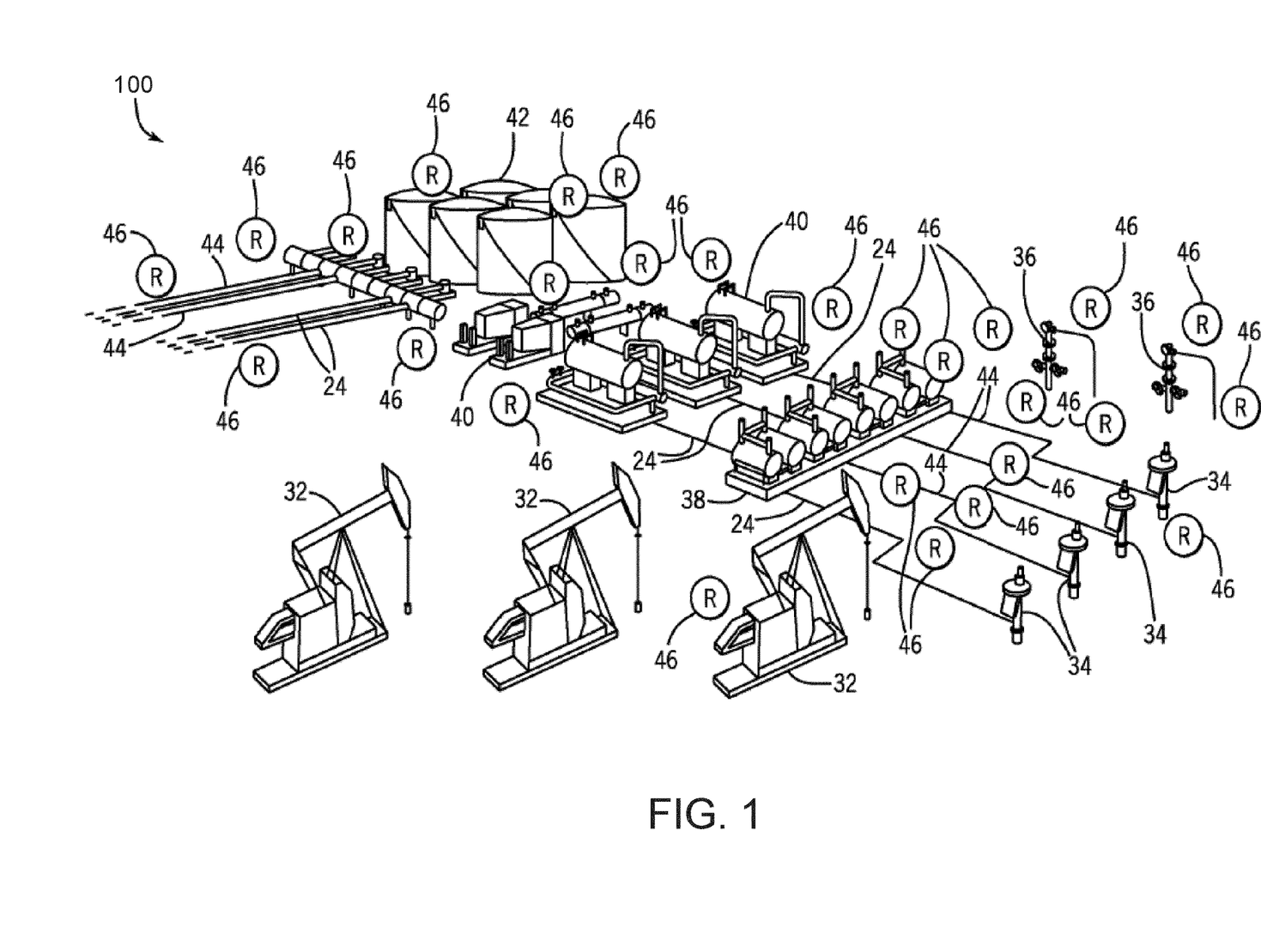
FIG. 1 is a perspective view of a hydrocarbon site equipped with well devices, according to some embodiments.

Referring now to FIG. 1, a hydrocarbon site 100 may be an area in which hydrocarbons, such as crude oil and natural gas, may be extracted from the ground, processed, and stored. As such, the hydrocarbon site 100 may include a number of wells and a number of well devices that may control the flow of hydrocarbons being extracted from the wells. In one embodiment, the well devices at the hydrocarbon site 100 may include any device equipped to monitor and/or control production of hydrocarbons at a well site. As such, the well devices may include pump jacks 32, submersible pumps 34, well trees 36, and other devices for assisting the monitoring and flow of liquids or gasses, such as petroleum, natural gasses and other substances. After the hydrocarbons are extracted from the surface via the well devices, the extracted hydrocarbons may be distributed to other devices such as wellhead distribution manifolds 38, separators 40, storage tanks 42, and other devices for assisting the measuring, monitoring, separating, storage, and flow of liquids or gasses, such as petroleum, natural gasses and other substances. At the hydrocarbon site 100, the pump jacks 32, submersible pumps 34, well trees 36, wellhead distribution manifolds 38, separators 40, and storage tanks 42 may be connected together via a network of pipelines 44. As such, hydrocarbons extracted from a reservoir may be transported to various locations at the hydrocarbon site 100 via the network of pipelines 44.

The pump jack 32 may mechanically lift hydrocarbons (e.g., oil) out of a well when a bottom hole pressure of the well is not sufficient to extract the hydrocarbons to the surface. The submersible pump 34 may be an assembly that may be submerged in a hydrocarbon liquid that may be pumped. As such, the submersible pump 34 may include a hermetically sealed motor, such that liquids may not penetrate the seal into the motor. Further, the hermetically sealed motor may push hydrocarbons from underground areas or the reservoir to the surface.

The well trees 36 or Christmas trees may be an assembly of valves, spools, and fittings used for natural flowing wells. As such, the well trees 36 may be used for an oil well, gas well, water injection well, water disposal well, gas injection well, condensate well, and the like. The wellhead distribution manifolds 38 may collect the hydrocarbons that may have been extracted by the pump jacks 32, the submersible pumps 34, and the well trees 36, such that the collected hydrocarbons may be routed to various hydrocarbon processing or storage areas in the hydrocarbon site 100.

The separator 40 may include a pressure vessel that may separate well fluids produced from oil and gas wells into separate gas and liquid components. For example, the separator 40 may separate hydrocarbons extracted by the pump jacks 32, the submersible pumps 34, or the well trees 36 into oil components, gas components, and water components. After the hydrocarbons have been separated, each separated component may be stored in a particular storage tank 42. The hydrocarbons stored in the storage tanks 42 may be transported via the pipelines 44 to transport vehicles, refineries, and the like.

The well devices may also include monitoring systems that may be placed at various locations in the hydrocarbon site 100 to monitor or provide information related to certain aspects of the hydrocarbon site 100. As such, the monitoring system may be a controller, a remote terminal unit (RTU), or any computing device that may include communication abilities, processing abilities, and the like. For discussion purposes, the monitoring system will be embodied as the RTU 46 throughout the present disclosure. However, it should be understood that the RTU 46 may be any component capable of monitoring and/or controlling various components at the hydrocarbon site 100. The RTU 46 may include sensors or may be coupled to various sensors that may monitor various properties associated with a component at the hydrocarbon site 10.

The RTU 46 may then analyze the various properties associated with the component and may control various operational parameters of the component. For example, the RTU 46 may measure a pressure or a differential pressure of a well or a component (e.g., storage tank 42) in the hydrocarbon site 100. The RTU 46 may also measure a temperature of contents stored inside a component in the hydrocarbon site 100, an amount of hydrocarbons being processed or extracted by components in the hydrocarbon site 100, and the like. The RTU 46 may also measure a level or amount of hydrocarbons stored in a component, such as the storage tank 42. In certain embodiments, the RTU 46 may be iSens-GP Pressure Transmitter, iSens-DP Differential Pressure Transmitter, iSens-MV Multivariable Transmitter, iSens-T2 Temperature Transmitter, iSens-L Level Transmitter, or Isens-10 Flexible 1/0 Transmitter manufactured by vMonitor® of Houston, Tex. In some embodiments, hundreds or even thousands of different devices (e.g., including internal products and $3^{rd}$ party products) may be supported and the previously mentioned devices are intended as only exemplary embodiments and are not intended to be limiting.

In one embodiment, the RTU 46 may include a sensor that may measure pressure, temperature, fill level, flow rates, and the like. The RTU 46 may also include a transmitter, such as a radio wave transmitter, that may transmit data acquired by the sensor via an antenna or the like. The sensor in the RTU 46 may be wireless sensors that may be capable of receive and sending data signals between RTUs 26. To power the sensors and the transmitters, the RTU 46 may include a battery or may be coupled to a continuous power supply. Since the RTU 46 may be installed in harsh outdoor and/or explosion-hazardous environments, the RTU 46 may be enclosed in an explosion-proof container that may meet certain standards established by the National Electrical Manufacturer Association (NEMA) and the like, such as a NEMA 4X container, a NEMA 7X container, and the like.

The RTU 46 may transmit data acquired by the sensor or data processed by a processor to other monitoring systems, a router device, a supervisory control and data acquisition (SCADA) device, or the like. As such, the RTU 46 may enable users to monitor various properties of various components in the hydrocarbon site 100 without being physically located near the corresponding components. The RTU 46 can be configured to communicate with the devices at the hydrocarbon site 100 as well as mobile computing devices via various networking protocols.

In operation, the RTU 46 may receive real-time or near real-time data associated with a well device. The data may include, for example, tubing head pressure, tubing head temperature, case head pressure, flowline pressure, wellhead pressure, wellhead temperature (e.g., temperature measurements from downhole (in the well), etc.), and the like. In any case, the RTU 46 may analyze the real-time data with respect to static data that may be stored in a memory of the RTU 46. The static data may include a well depth, a tubing length, a tubing size, a choke size, a reservoir pressure, a bottom hole temperature, well test data, fluid properties of the hydrocarbons being extracted, and the like. The RTU 46 may also analyze the real-time data with respect to other data acquired by various types of instruments (e.g., water cut meter, multiphase meter) to determine an inflow performance relationship (IPR) curve, a desired operating point for the wellhead 30, key performance indicators (KPis) associated with the wellhead 30, wellhead performance summary reports, and the like. Although the RTU 46 may be capable of performing the above-referenced analyses, the RTU 46 may not be capable of performing the analyses in a timely manner. Moreover, by just relying on the processor capabilities of the RTU 46, the RTU 46 is limited in the amount and types of analyses that it may perform. Moreover, since the RTU 46 may be limited in size, the data storage abilities may also be limited. The RTU 46 can be configured to receive time series data and provide time-series data.

In certain embodiments, the RTU 46 may establish a communication link with the cloud-based computing system 12 described above. As such, the cloud-based computing system 12 may use its larger processing capabilities to analyze data acquired by multiple RTUs 26. Moreover, the cloud-based computing system 12 may access historical data associated with the respective RTU 46, data associated with well devices associated with the respective RTU 46, data associated with the hydrocarbon site 100 associated with the respective RTU 46 and the like to further analyze the data acquired by the RTU 46. The cloud-based computing system 12 is in communication with the RTU via one or more servers or networks (e.g., the Internet, a private corporate network, etc.).

Site Control System

Figure 2:
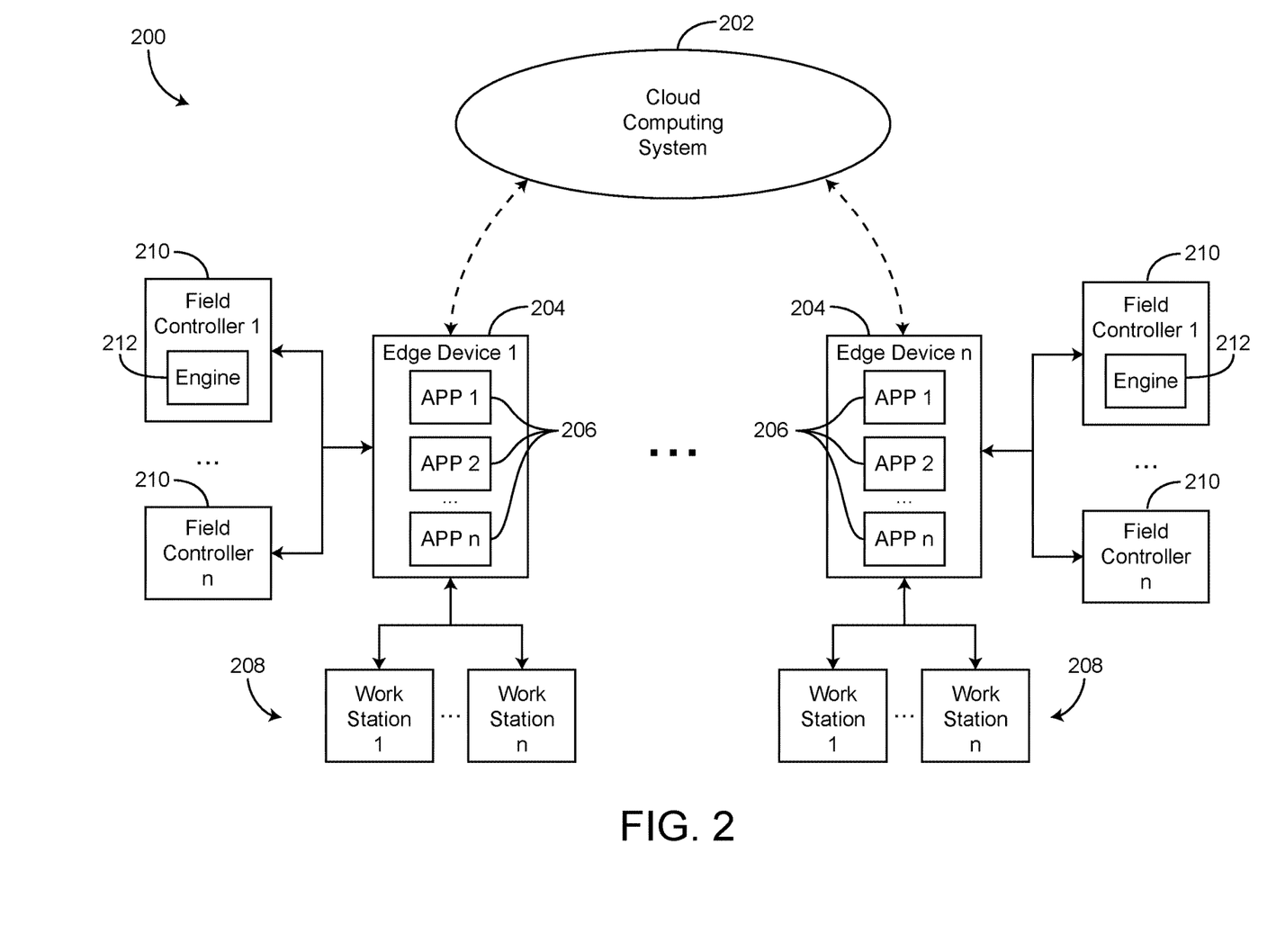
FIG. 2 is a block diagram of a control system for the hydrocarbon site of FIG. 1, according to some embodiments.

Referring particularly to FIG. 2, control system 200 for hydrocarbon site 100 is shown, according to some embodiments. In some embodiments, control system 200 includes or is configured to communicate with cloud computing system 202 and is configured to control various operations of a well site (e.g., hydrocarbon site 100) based on analyzing metadata from various devices within control system 200. Cloud computing system 202 may include any processing circuitry, processors, memory, etc., or combination thereof that are positioned remotely from hydrocarbon site 100. In various embodiments, some or all of the processing circuity, processors, memory, etc., or combination thereof within cloud computing system 202 may be performed by various devices disclosed within control system 200. Control system 200 is further shown to include edge devices 204, and workstations 208, and field controllers 210.

While cloud computing system 202 is generally disclosed herein as performing some or all of the functionality of the methods disclosed herein, cloud-based architecture (e.g., cloud computing system 202 connected to edge device(s) 204 and field controller 210, etc.) is purely an exemplary embodiment and is not intended to be limiting. In some embodiments, the methods disclosed herein may be implemented by systems that do not include or utilize a cloud-based computing system (e.g., cloud computing system 202). In some embodiments, the systems and methods disclosed herein are architecture agnostic, such that they may be implemented across a variety of architectures including private or on premise server infrastructure.

Edge devices 204 may be configured to run, perform, implement, store, etc., one or more applications 206 thereof. Additionally, some or all processing circuity, processors, memory, etc. included in various devices within control system 200 (e.g., edge device 204, field controller 210, workstation 208, etc.) may be distributed across several other devices within control system 200 or integrated into a single device. Edge device(s) 204 may be configured to receive data from field controller(s) 210 and provide data analytics to cloud computing system 202 based on the received data. This is described in greater detail below with reference to FIG. 3.

In some embodiments, each edge device 204 includes a processing circuit having a processor and memory. The processor can be a general purpose or specific purpose processor, an application specific integrated circuit (ASIC), one or more field programmable gate arrays (FPGAs), a group of processing components, or other suitable processing components. The processor is configured to execute computer code or instructions stored in the memory or received from other computer readable media (e.g., CDROM, removable USB drive, network storage, a remote server, etc.), according to some embodiments.

In some embodiments, the memory can include one or more devices (e.g., memory units, memory devices, storage devices, etc.) for storing data and/or computer code for completing and/or facilitating the various processes described in the present disclosure. The memory can include random access memory (RAM), read-only memory (ROM), hard drive storage, temporary storage, non-volatile memory, flash memory, optical memory, or any other suitable memory for storing software objects and/or computer instructions. The memory can include database components, object code components, script components, or any other type of information structure for supporting the various activities and information structures described in the present disclosure. The memory can be communicably connected to the processor via the processing circuitry and can include computer code for executing (e.g., by the processor) one or more processes described herein.

In some embodiments, various edge device(s) 204 may include some or all functionality of remote terminal units (RTUs) (e.g., RTU 46). In various embodiments, edge device(s) 204 is not limited to the functionality of RTU's and can include other controller features. Similarly, RTU's, as described herein, may refer to any industrial edge controller which is programmable and/or capable of one or more applications, either individually or as a module within a broader system (e.g., system 200).

Field controllers 210 may be configured to control various operations at a well site and are communicably coupled with edge devices 204. In some embodiments, field controllers 210 are configured to operate (e.g., provide control signals to, provide setpoints to, adjust setpoints or operational parameters thereof) field equipment (e.g., electric submersible pumps (ESPs), cranes, pumps, etc.) of hydrocarbon site 100. Field controllers 210 may be grouped into different sets based on which edge device 204 field controller 210 communicate with. In some embodiments, edge device(s) 204 are configured to exchange any sensor data, measurement data, meter data (e.g., flow meter data), storage data, maintenance data, control signals, setpoint adjustments, operational adjustments, diagnostic data, analytics data, meta data, etc., with field controllers 210. It should be understood that each edge device 204 can be associated with, corresponding to, etc., multiple field controllers 210.

In some embodiments, one or more of field controllers 210 can include a computing engine 212. Computing engine 212 can be configured to perform various control, diagnostic, analytic, reporting, meta data-related, etc., functions. Computing engine 212 can be embedded in one or more of field controller 210, or may be embedded at one or more of edge devices 204. In some embodiments, any of the functionality of computing engine 212 is distributed across multiple edge devices 204 and/or multiple field controllers 210. In some embodiments, any of the functionality of computing engine 212 is performed by cloud computing system 202.

Still referring to FIG. 2, work stations 208 may be configured to receive user instructions for controlling hydrocarbon site 100 and provide control signals to various devices via control system 200. Work stations 208 can include any desktop computer, laptop computer, personal computer device, user interface, personal computer device, etc., or any general computing device thereof. In some embodiments, multiple work stations 208 (e.g., an n number of work stations 208) are associated with each edge device 204, while in other embodiments, one or more of edge devices 204 are associated with a single work station 208.

In some embodiments, field controller(s) 210 may be configured to act as edge devices such that field controller(s) 210 perform additional processing (e.g., data analysis, mapping, etc.) prior to providing information to cloud computing system 202. In some embodiments, this decreases latency in information processing to cloud computing system 202. In other embodiments, edge device(s) 204 operate as traditional edge devices and perform significant storage and processing within control system 200 (e.g., on-site, at/near hydrocarbon site 100, etc.) to mitigate latency due to processing information in cloud computing system 202.

Field Controller

Figure 3:
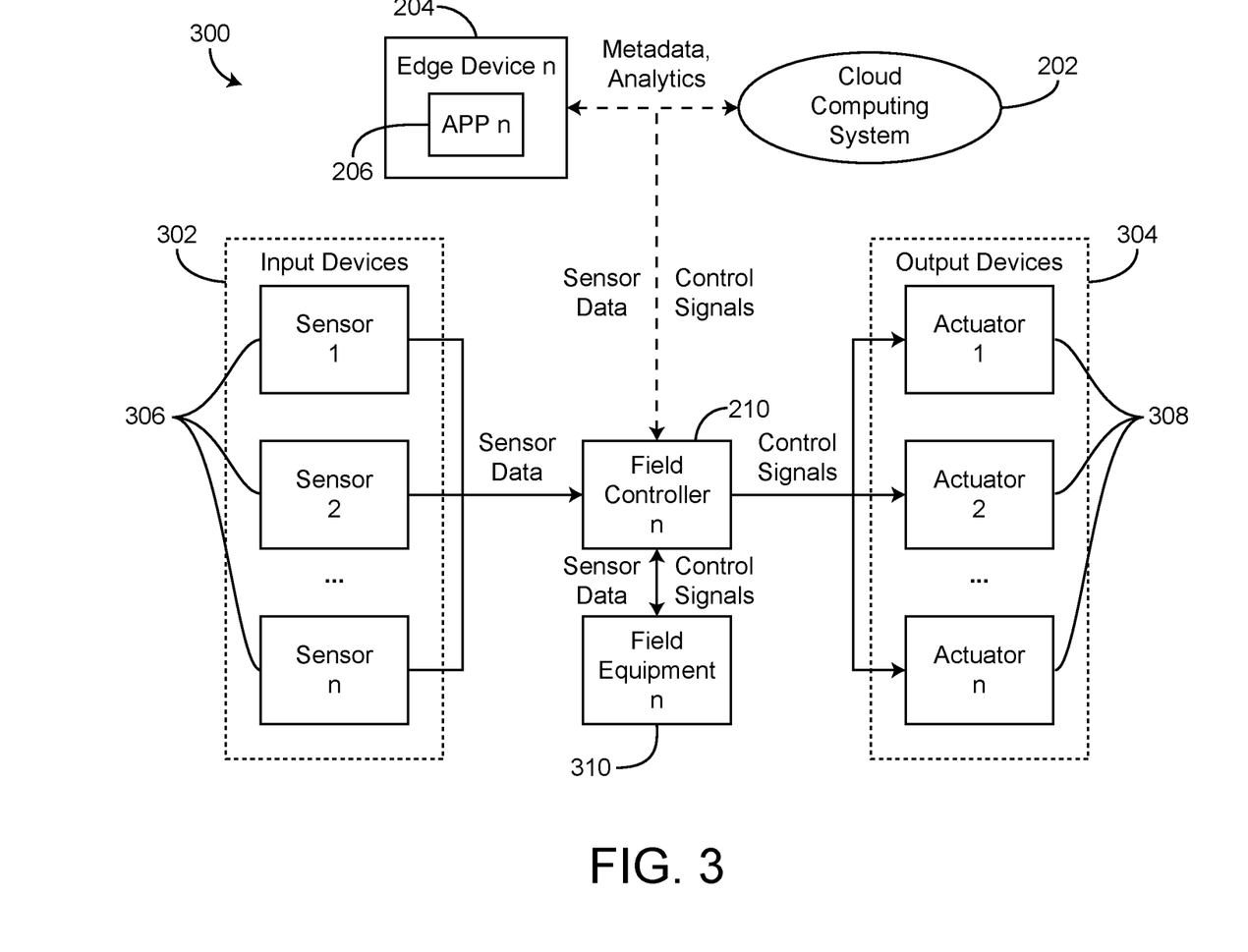
FIG. 3 is a block diagram of a portion of the control system of FIG. 2, showing a field controller communicating with field equipment, input devices, and output devices, according to some embodiments.

Referring now to FIG. 3, control system 200 for performing control of output devices 304 based on input devices 302 is shown, according to exemplary embodiments. Control system 200 is shown to include edge device 204 including application 206, cloud computing system 202, field controller 210, field equipment 310, input devices 302, and output devices 304.

Input devices 302 may be configured to provide various sensor data and/or field measurements from hydrocarbon site 100 to field controller 210 for processing. For example, Sensor 306 of input devices 302 is measuring the pump speed of pump 34. Sensor 306 provides the pump speed of pump 34 to field controller 210 at regular intervals (e.g., continuously, ever minute, every 5 minutes, etc.). Input devices 302 may be connected wired or wirelessly to field controller 210 or any other device within system 200 (e.g., edge device 204). In some embodiments, input devices 302 are coupled to various site equipment (e.g., pumps, pump jacks, cranes, etc.) and provide operational data of their respective site equipment to field controller 210.

In some embodiments, sensor(s) 306 refer to physical sensors (e.g., temperature sensors, flow sensors, etc.) and/or virtual sensors (e.g., inferential sensors, soft sensors, etc.). In some embodiments, virtual sensors provide identical or similar information as would a physical sensor, only via software applications. In some embodiments, virtual sensors learn to interpret the relationships between the different variables, and observe readings from various instruments. For example, rather than implementing several physical sensors at a site (e.g., hydrocarbon site 100), one or more virtual sensors may be placed on a simulation model to achieve identical or similar results.

Output devices 304 may be configured to receive control signals from field controller 210 and adjust operation based on the received control signals. For example, field controller 210 determines that pump 34 is operating at a lower pump speed than is considered optimal. Field controller 210 subsequently sends a control signal to actuator 308 to increase pump speed for pump 34. In some embodiments, output devices 304 are configured to act as any device (e.g., actuator, etc.) capable of adjusting operation of site equipment within hydrocarbon site 100. In some embodiments, various other field equipment (e.g., field equipment 310) include some or all of the functionality of input devices 302 and output devices 304 and provide sensor data and receive control signals from field controller 210.

In some embodiments, control system 200 is configured to analyze various sets of data (e.g., metadata) to determine control schema that is optimal for hydrocarbon site 100. A significant amount of processing for this may be performed by edge devices (e.g., edge device 204), instead of processing all metadata analytics in the cloud, as processing the data in on-site or proximate edge devices can decrease latency compared to sending the data to cloud computing system 202 for processing. For example, sensors 306 provide metadata to field controller 210. Field controller 210 processes the data to determine the type of data and/or domain from which the data is received and provides the data to edge device 204 for analytics. An application within edge device 204 (e.g., application 206) may analyze the metadata to make decisions about the control schema that would have been otherwise unnoticed by processing within control system 200. For example, application 206 may infer that the data received has been received by a flow meter sensor (e.g., sensor (1) 306), based on the patterns seen in the data and a priori data that edge device 204 has analyzed. Application 206 may make inferences, predictions, and calculations based on current and/or past data.

In some embodiments, application 206 provides some or all of the data to cloud computing system 202 for further processing. Application 206 may be configured to make inferences about received data that improves the standardization of data analytics. For example, sensor (1) 306 and sensor (2) 306 may be flow sensors, but from different vendors. As such, sensor (1) 306 may provide data to field controller 210 in a different format than sensor (2) 306. However, application 206 of edge device 204 may still be able to standardize the data and determine that both sets of data are from flow sensors, despite the received data being in different formats (e.g., one data set is provided under resource description framework (RDF) specifications, one data set is provided as data objects, etc.). In various embodiments, allowing edge device 204 to perform some or all of the metadata analytics allows for improved data analytics and control schema without significantly increasing processing latency.

Edge Device Management System

Figure 4:
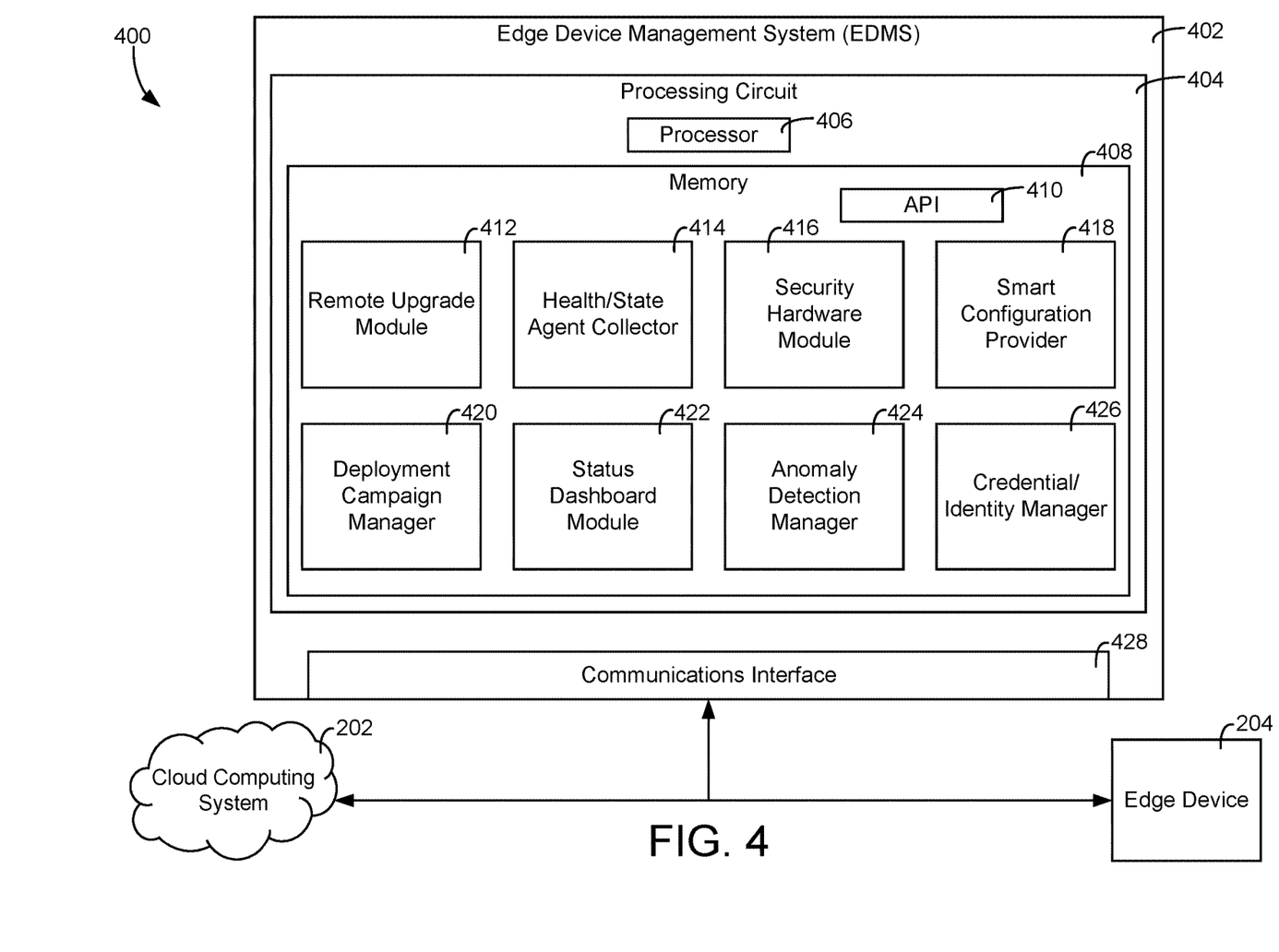
FIG. 4 is a block diagram of an edge device management system which can be incorporated into the control system of FIG. 2, according to some embodiments.

Referring now to FIG. 4, an edge device system 400 is shown, according to some embodiments. System 400 is shown to include edge device management system (EDMS) 402, cloud computing system 202, and edge device 204. In some embodiments, EDMS 402 is configured to perform various processes or services for updating/configuring a set of edge devices. In some embodiments, the edge devices (e.g., edge devices 204 (1-n)) are updated not by a monolithic approached but rather by a more modular configuration suited for each edge device. EDMS 402 is shown to include processing circuit 404 including processor 406 and memory 408, and communications interface 428.

Communications interface 428 can be or include wired or wireless communications interfaces (e.g., jacks, antennas, transmitters, receivers, transceivers, transmitters, wire terminals, etc.) for conducting data communications with various edge devices and/or cloud computing system 202. In various embodiments, communications via communications interface 428 can be direct (e.g., local wired or wireless communications) or via a communications network (e.g., cloud computing system 202). For example, interface 428 can include an Ethernet card and port for sending and receiving data via Ethernet-based communications link or network. In another example, interface 428 can include a Wi-Fi transceiver for communicating via a wireless communications network. In another example, interface 428 can include cellular or mobile phone communication transceivers.

Processing circuit 404 can be communicably connected to communications interface 428 such that processing circuit 404 and the various components thereof can send and receive data via interface 428. Processor 406 can be implemented as a general purpose processor, an application specific integrated circuit, one or more field programmable gate arrays (FPGAs), a group of processing components, or other suitable electronic processing components.

Memory 408 (e.g., memory, memory unit, storage device, etc.) can include one or more devices (e.g., RAM, ROM, Flash memory, hard disk storage, etc.) for storing data and/or computer code for completing or facilitating the various processes, layers and modules described in the present application. Memory 408 can be or include volatile memory or non-volatile memory. Memory 408 can include database components, object code components, script components, or any other type of information structure for supporting the various activities and information structures described in the present application. According to an example embodiment, memory 408 is communicably connected to processor 406 via processing circuit 404 and includes computer code for executing (e.g., by processing circuit 404 and/or processor 406) one or more processes described herein.

In some embodiments, EDMS 402 is implemented within a single computer (e.g., one server, one housing, etc.). In various other embodiments EDMS 402 can be distributed across multiple servers or computers (e.g., that can exist in distributed locations). Further, while FIG. 4 shows edge device(s) 204 existing outside of EDMS 402, in some embodiments, applications edge device(s) 204 can be hosted within EDMS 402 (e.g., within memory 408). Memory 408 is shown to include remote upgrade module 412, health/state agent collector 414, security hardware module 416, smart configuration provider 418, deployment campaign manager 420, status dashboard module 422, anomaly detection manager 424, and credential identity manager 426.

API 410 may include one or more processes or services for interacting with one or more additional processing devices (e.g., off-site servers, etc.) to send and receive data via one or more application programming interfaces (APIs). In some embodiments, API 410 allows for integration between EDMS 402 and other applications, including status dashboards, an application store interface, industry/domain specific user applications (e.g., an oil and gas production optimization solution that may utilize API 410 to inform the oil and gas user that the device is online and "healthy"), customer/third-party analytic tools, and enterprise systems. In some embodiments, the application store is part of EDMS 402. In other embodiments, the application store is external. In some embodiments, the API provides abstraction such that either option is possible.

Remote upgrade module 412 may be configured to enable remote upgrades for various components of edge device(s) 204, including basic input/output system (BIOS), the boot loader, kernel/OS, or any other software. In some embodiments, the remote upgrade from EDMS 402 to edge device(s) 204 is unique to each edge device 204, such that EDMS 402 is required to facilitate appropriate configuration to the various edge device(s) 204. In some embodiments, capabilities on edge device(s) 204, EDMS 402, cloud computing system 202, or any combination thereof enables remote upgrades of software/applications and may include additional features (e.g., retries, fail-over strategies, encryption, signing and integrity checking, etc.) to ensure the safe, reliable delivery of an upgrade over a slow or lossy network. In some embodiments, the EDMS 402 may facilitate point-to-point (P2P) updates by enabling the local caching of update packages and communicating the availability to peer devices in the same network segment to save on metered bandwidth costs and/or download times. In some embodiments, the update packages can be provided to at least one local device of the several edge devices. For example, the update package may only be relevant to the local devices that might use the nearby cache (.e.g., as opposed to an off-premise server). In some embodiments, the update packages may include at least one of retries, fail-over strategies, encrypting, signing signature validation, or integrity validation.

Health state agent collector 414 may be configured to act as an agent (e.g., collector, etc.) for collecting state and health information from edge device(s) 204. In some embodiments, health state agent collector 414 acts as a data collector for collecting various physical device parameters and parameters from subcomponents of edge device(s) 204, including device temperature, voltage levels, amount of free disk space remaining, amount of RAM remaining, and CPU utilization. In some embodiments, health state agent collector 414 collects data on the software running on edge device(s) 204, either as native applications or containerized applications. This may include information such as container state, container uptime, resource utilization on a per process or container basis, or application version.

Security hardware module 416 may be configured to act as a security service (e.g., Trusted Platform Module, etc.) or equivalent service such that remote features on edge device(s) 204 can be enabled/disabled, inspected for state, or otherwise interacted with. In some embodiments, supported hardware-enabled features may include hardware to enable "chain of trust" for the BIOS, boot loader, kernel/OS, application signing, device identity, full-disk decryption and secure key or credential storage.

Smart configuration provider 418 may be configured to receive high-level requests from a user (e.g., "I would like to install application X") and determine/resolve the underlying changes to edge device(s) 204 on an instance-by-instance bases to achieve the request provided by the user. For example, the user may want to install "Application X" on 10 separate edge devices. However, these 10 edge devices have 7 different configurations and sets of applications. EDMS 402 resolves which new packages need to be deployed, which configuration files need to be updated, which applications need to be upgraded, and executes these changes in a safe sequence that results in the user's desired state on all 10 edge devices without causing an unacceptable disruption in service or requiring that the user resolve these details at a granular level. In some embodiments, these updated include deployment combinations and/or specific versions of application software, containers, configurations, or other resource files.

Deployment campaign manager 420 may be configured to deploy campaign management tools for directing the deployment or removal of one or more applications in edge device(s) 204. In some embodiments, this is performed such that an administrator or end-user can direct the deployment or removal of an application (or application version) based on logical rules. For example, the user may wish to define a deployment/update campaign based on device geographical location (e.g., deploy a test version to units close to town, in case of problems), device or application age (e.g., deploy the update to the units running the oldest software), staggered rollout (e.g., update 10% of the population at a time, waiting 1 minute between each device and 1 hour between each phase), or device hardware version, type, family, or serial number range.

Status dashboard module 422 may be configured to enable users (e.g., administrators, developers, end-users, etc.) to visualize the health, state, version, or other features of edge device(s) 204. In some embodiments, status dashboard module 422 is configured to receive alerts, notifications, and/or updates (e.g., on device exception states). For example, status dashboard module 422 receives alarms if a device is offline for more than 30 minutes or the signal strength is below −110 dBm for more than 60 minutes.

Anomaly detection manager 424 may be configured to run on EDMS 402, in cloud computing system 202, on edge device(s) 204, or any combination thereof. In some embodiments, anomaly detection manager 424 is configured to use statistical/analytical methods and/or machine learning/AI techniques to detect abnormal behavior in edge device(s) 204 or a network (e.g., cloud computing system 202). In some embodiments, anomaly detection manager 424 is used to identify security intrusions or network issues.

Credential identity manager 426 may be configured to identify various features of edge device(s) 204 for various enablement features. For example, credential identity manager 426 may identify management features that enable devices to be locked, wiped, or geo-fenced with alerts or behaviors being modified if the device appears to be unexpectedly moving or compromised. In some embodiments, credential identity manager 426 assigns roles to users and/or administrators on a per-device or device group level. For example, Sally can interact with all devices X both remotely and locally. However, Bob can only interact with devices 1, 2, and 27 remotely, and all of devices Y locally/physically. In some embodiments, credential identity manager 426 enables device identities and device roles/rights (e.g., device 1 trusts device 2 to provide control inputs, etc.).

Figure 5:
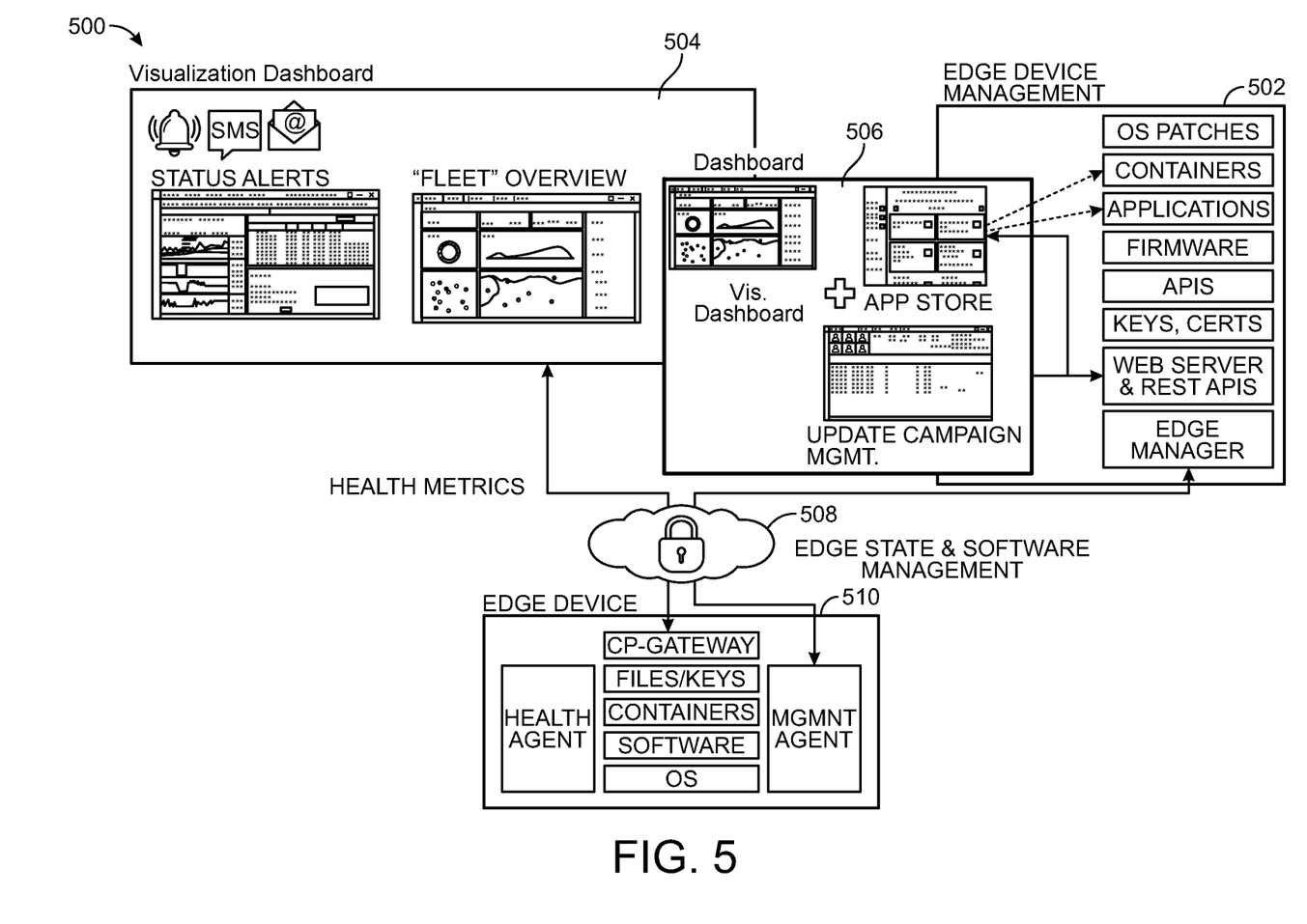
FIG. 5 is a diagram of edge device management techniques which can be implemented by the edge device management system of FIG. 4, according to some embodiments.

Referring now to FIG. 5, a diagram 500 with various features of edge device management is shown, according to exemplary embodiments. Diagram 500 is shown to include edge device management system (EDMS) 502, visualization dashboard 504, dashboard 506, and edge device 510. In some embodiments, EDMS 502 incorporates some or all of the features and functionality of EMS 402 as disclosed above with reference to FIG. 4, and vice versa. Similarly, edge device(s) 510 may include some or all of the features and functionality of edge device(s) 204 as disclosed above with reference to FIGS. 2-3, and vice versa.

EDMS 502 includes OS patches, containers, applications, firmware, APIs, keys, certifications, web server APIs, REST APIs, and an edge device manager. In some embodiments, EDMS 502 displays various windows (e.g., via connection/production window 504) to an interface via one or more APIs, including connected production windows, application store windows, status alerts, fleet overviews, and update campaign management windows.

Edge device 510 is shown providing various data to EDMS 502 (e.g., via connection/production window 504). In some embodiments, EMDS 502 provides health metrics to visualization dashboard 504 for display to a user. Edge device is shown to include a heath agent module, files/keys, containers, various software, OS, a cp-gateway, and a management agent. In some embodiments, edge device(s) 510 provides various information relating to system 100 to EDMS 502 for processing via cloud 508.

While FIG. 5 is showing different windows (e.g., visualization dashboard 504 is separate from dashboard 506, etc.), some or all of the information may be shown either partially or entirely within visualization dashboard 504 and/or dashboard 506. For example, a single window may show all of the status alerts and fleet overview information from visualization dashboard 504, along with the dashboard information, application store information, and update campaign management information from dashboard 506.

Edge Device Management Processes

Figure 6:
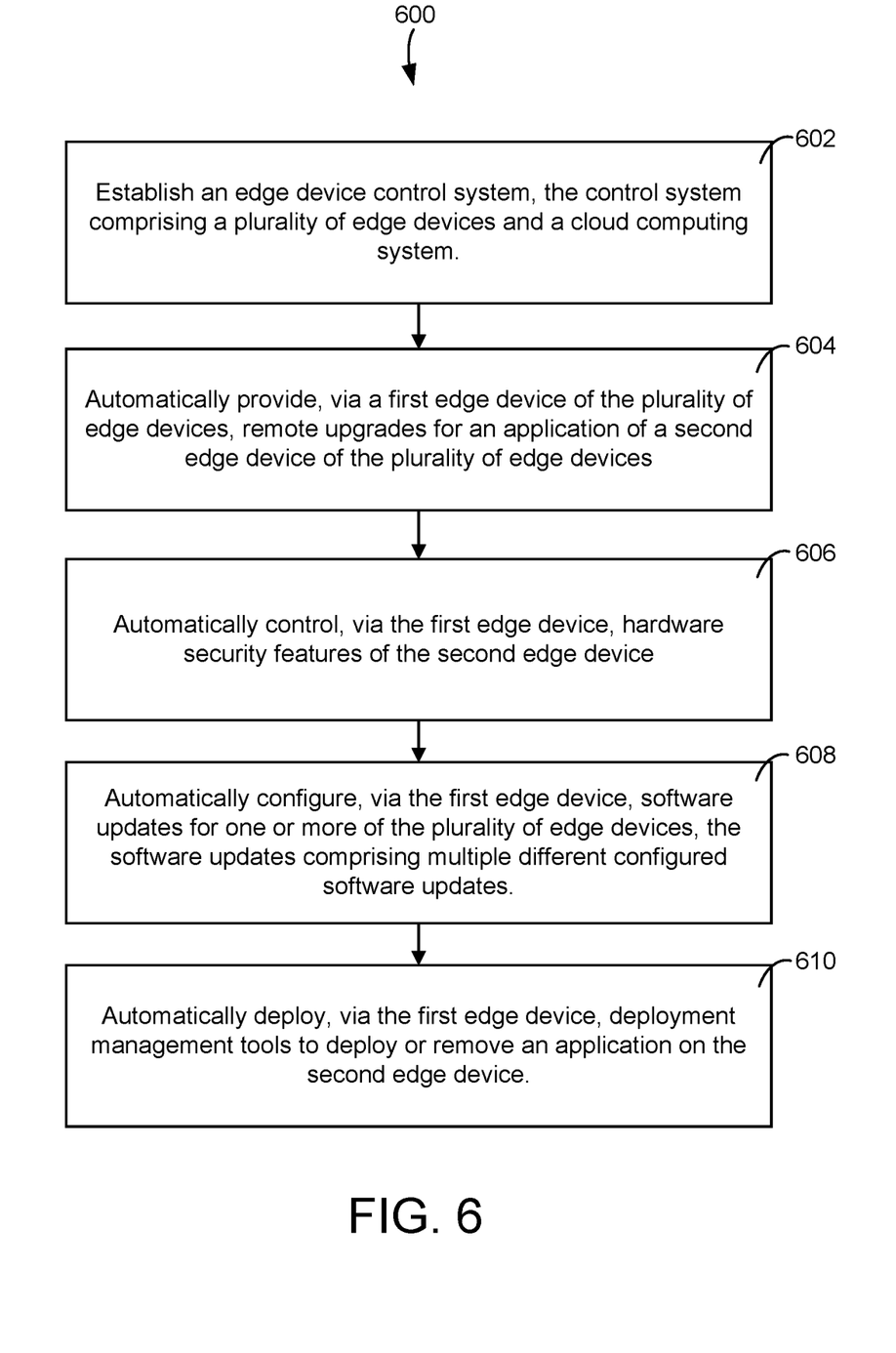
FIG. 6 is a flow diagram of a process for implementing various processes for optimizing edge device management, which can be performed by the edge device management system of FIG. 4, according to some embodiments.

Referring now to FIG. 6, a process 600 for implementing various services for edge device management is shown, according to exemplary embodiments. Process 600 may be implemented by EDMS 402, edge device(s) 204, field controller 210, or any combination thereof. In some embodiments, process 600 is performed in various locations with one or more steps performed at one or more locations.

Process 600 is shown to include establishing an edge device control system, the control system comprising a plurality of edge devices and a cloud computing system (step 602). Process 600 is shown to include automatically providing, via a first edge device of the plurality of edge devices, remote upgrades for an application of a second edge device of the plurality of edge devices (step 604). Process 600 is shown to include automatically controlling, via the first edge device, hardware security features of the second edge device (step 606). Process 600 is shown to include automatically configuring, via the first edge device, software updates for one or more of the plurality of edge devices, the software updates comprising multiple different configured software updates (step 608). Process 600 is shown to include automatically deploying, via the first edge device, deployment management tools to deploy or remove an application on the second edge device (step 610).

Figure 7:
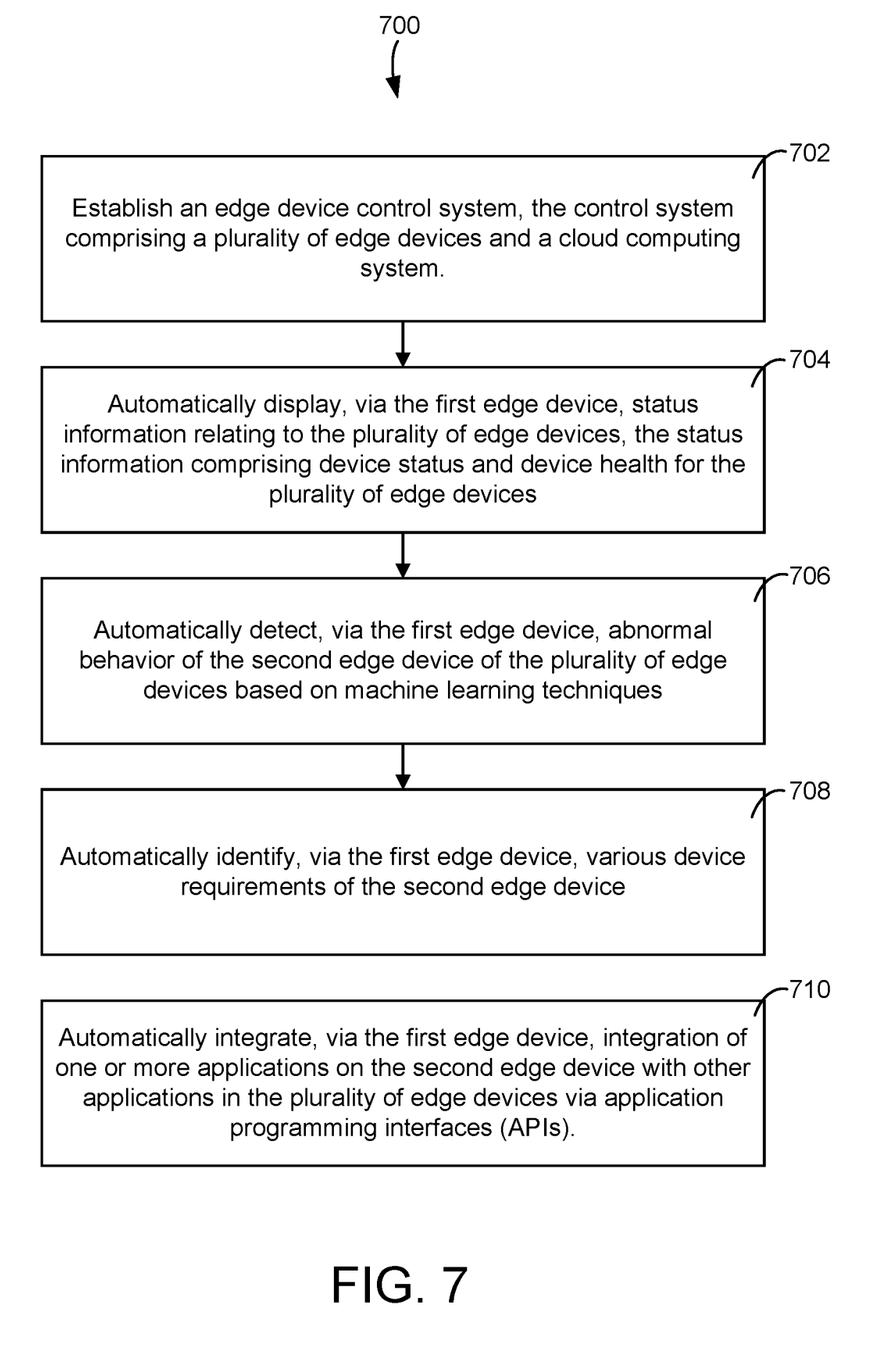
FIG. 7 is a flow diagram of a process for implementing various processes for optimizing edge device management, which can be performed by the edge device management system of FIG. 4, according to some embodiments.

Referring now to FIG. 7, a process 700 for implementing various services for edge device management is shown, according to exemplary embodiments. Process 700 may be implemented by EDMS 402, edge device(s) 204, field controller 210, or any combination thereof. In some embodiments, process 700 is performed in various locations with one or more steps performed at one or more locations.

Process 700 is shown to include establishing an edge device control system, the control system comprising a plurality of edge devices and a cloud computing system (step 702). Process 700 is shown to include automatically displaying, via the first edge device, status information relating to the plurality of edge devices, the status information comprising device status and device health for the plurality of edge devices (step 704). Process 700 is shown to include automatically detecting, via the first edge device, abnormal behavior of the second edge device of the plurality of edge devices based on machine learning techniques (step 706). In some embodiments, machine learning techniques can include any type of machine learning processing, such as statistical analysis, deep learning, implementing of neural networks, and other techniques. The machine learning techniques can include any type of artificial intelligence, and can include any number of goals, such as general intelligence, planning, predictions, computer vision, knowledge reasoning, and natural language processing.

Process 700 is shown to include automatically identifying, via the first edge device, various device requirements of the second edge device (step 708). Process 700 is shown to include automatically integrating, via the first edge device, integration of one or more applications on the second edge device with other applications in the plurality of edge devices via application programming interfaces (APIs) (step 710).

Configuration of Exemplary Embodiments

As utilized herein, the terms "approximately," "about," "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the disclosure as recited in the appended claims.

It should be noted that the term "exemplary" and variations thereof, as used herein to describe various embodiments, are intended to indicate that such embodiments are possible examples, representations, or illustrations of possible embodiments (and such terms are not intended to connote that such embodiments are necessarily extraordinary or superlative examples).

The term "coupled" and variations thereof, as used herein, means the joining of two members directly or indirectly to one another. Such joining may be stationary (e.g., permanent or fixed) or moveable (e.g., removable or releasable). Such joining may be achieved with the two members coupled directly to each other, with the two members coupled to each other using a separate intervening member and any additional intermediate members coupled with one another, or with the two members coupled to each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic.

The term "or," as used herein, is used in its inclusive sense (and not in its exclusive sense) so that when used to connect a list of elements, the term "or" means one, some, or all of the elements in the list. Conjunctive language such as the phrase "at least one of X, Y, and Z," unless specifically stated otherwise, is understood to convey that an element may be either X, Y, Z; X and Y; X and Z; Y and Z; or X, Y, and Z (i.e., any combination of X, Y, and Z). Thus, such conjunctive language is not generally intended to imply that certain embodiments require at least one of X, at least one of Y, and at least one of Z to each be present, unless otherwise indicated.

References herein to the positions of elements (e.g., "top," "bottom," "above," "below") are merely used to describe the orientation of various elements in the FIGURES. It should be noted that the orientation of various elements may differ according to other exemplary embodiments, and that such variations are intended to be encompassed by the present disclosure.

The hardware and data processing components used to implement the various processes, operations, illustrative logics, logical blocks, modules and circuits described in connection with the embodiments disclosed herein may be implemented or performed with a general purpose single- or multi-chip processor, a digital signal processor (DSP), an application specific integrated circuit (ASIC), a field programmable gate array (FPGA), or other programmable logic device, discrete gate or transistor logic, discrete hardware components, or any combination thereof designed to perform the functions described herein. A general purpose processor may be a microprocessor, or, any conventional processor, controller, microcontroller, or state machine. A processor also may be implemented as a combination of computing devices, such as a combination of a DSP and a microprocessor, a plurality of microprocessors, one or more microprocessors in conjunction with a DSP core, or any other such configuration. In some embodiments, particular processes and methods may be performed by circuitry that is specific to a given function. The memory (e.g., memory, memory unit, storage device) may include one or more devices (e.g., RAM, ROM, Flash memory, hard disk storage) for storing data and/or computer code for completing or facilitating the various processes, layers and modules described in the present disclosure. The memory may be or include volatile memory or non-volatile memory, and may include database components, object code components, script components, or any other type of information structure for supporting the various activities and information structures described in the present disclosure. According to an exemplary embodiment, the memory is communicably connected to the processor via a processing circuit and includes computer code for executing (e.g., by the processing circuit or the processor) the one or more processes described herein.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

Although the figures and description may illustrate a specific order of method steps, the order of such steps may differ from what is depicted and described, unless specified differently above. Also, two or more steps may be performed concurrently or with partial concurrence, unless specified differently above. Such variation may depend, for example, on the software and hardware systems chosen and on designer choice. All such variations are within the scope of the disclosure. Likewise, software implementations of the described methods could be accomplished with standard programming techniques with rule-based logic and other logic to accomplish the various connection steps, processing steps, comparison steps, and decision steps.

It is important to note that the construction and arrangement of various systems (e.g., system 100, system 200, etc.) and methods as shown in the various exemplary embodiments is illustrative only. Additionally, any element disclosed in one embodiment may be incorporated or utilized with any other embodiment disclosed herein. Although only one example of an element from one embodiment that can be incorporated or utilized in another embodiment has been described above, it should be appreciated that other elements of the various embodiments may be incorporated or utilized with any of the other embodiments disclosed herein.

What is claimed is:

1. An edge device management system comprising a plurality of edge devices, wherein each device comprises a processing circuit configured to:
   provide, via a first edge device of the plurality of edge devices, remote upgrades for an application of a second edge device of the plurality of edge devices comprising providing a point-to-point (P2P) update by:
      enabling, via the first edge device, a local caching of update packages; and
      providing, via the first edge device, an indication of availability of the update packages to at least a portion of the plurality of edge devices, wherein the update packages are relevant to the portion of the plurality of edge devices;
   control, via the first edge device, hardware security features of the second edge device;
   configure, via the first edge device, a software update package for the second edge device, the software update package comprising a plurality of different software updates; and
   deploy, via the first edge device, one or more deployment management tools to manage the application on the second edge device.

2. The system of claim 1, wherein providing the remote upgrades for the application comprises providing the remote upgrades to at least one of a basic input/output system (BIOS), a boot loader, an operating system (OS), a software application, or a system kernel.

3. The system of claim 1, wherein providing the remote upgrades for the application comprises providing reliability features comprising at least one of retries, fail-over strategies, encrypting, signing checking, or integrity checking.

4. The system of claim 1, wherein deploying the one or more deployment management tools to manage the application comprises deploying the application on the second edge device or removing the application on the second edge device.

5. The system of claim 1, wherein the processing circuit is further configured to:
   receive instructions from a user interface; and
   adjust the software update package on an instance-by-instance basis based on the received instructions.

6. The system of claim 1, wherein the processing circuit is further configured to:
   detect, via at least one of the plurality of edge devices, abnormal behavior of the second edge device of the plurality of edge devices using machine learning techniques;
   identify, via the first edge device, one or more device requirements of the second edge device; and
   integrate, via the first edge device, integration of one or more applications on the second edge device with other applications in the plurality of edge devices via one or more application programming interfaces (APIs).

7. A method for managing a plurality of edge devices, the method comprising:
   providing, via a first edge device of the plurality of edge devices, remote upgrades for an application of a second edge device of the plurality of edge devices comprising providing a point-to-point (P2P) update by:
      enabling, via the first edge device, a local caching of update packages; and
      providing, via the first edge device, an indication of availability of the update packages to at least a portion of the plurality of edge devices, wherein the update packages are relevant to the portion of the plurality of edge devices;
   controlling, via the first edge device, hardware security features of the second edge device;
   configuring, via the first edge device, a software update package for the second edge device, the software update package comprising a plurality of different software updates; and
   deploying, via the first edge device, one or more deployment management tools to manage the application on the second edge device.

8. The method of claim 7, wherein providing the remote upgrades for the application comprises providing the remote upgrades to at least one of a basic input/output system (BIOS), a boot loader, an operating system (OS), a software application, or a system kernel.

9. The method of claim 7, wherein providing the remote upgrades for the application comprises providing reliability features comprising at least one of retries, fail-over strategies, encrypting, signing checking, or integrity checking.

10. The method of claim 7, wherein deploying the one or more deployment management tools to manage the application comprises deploying the application on the second edge device or removing the application on the second edge device.

11. The method of claim 7, wherein the method further comprises:
   receiving instructions from a user interface; and
   adjusting the software update package on an instance-by-instance basis based on the received instructions.

12. The method of claim 7, wherein the method further comprises:
   detecting, via at least one of the plurality of edge devices, abnormal behavior of the second edge device of the plurality of edge devices using machine learning techniques;
   identifying, via the first edge device, one or more device requirements of the second edge device; and
   integrating, via the first edge device, integration of one or more applications on the second edge device with other applications in the plurality of edge devices via one or more application programming interfaces (APIs).

13. A non-transitory computer readable media for managing a plurality of edge devices comprising a processing circuit comprising a processor and a memory, the memory storing instructions that, when executed by the processor, cause the media to perform automatic operations comprising:

provide, via a first edge device of the plurality of edge devices, remote upgrades for an application of a second edge device of the plurality of edge devices comprising providing a point-to-point (P2P) update by:
enabling, via the first edge device, a local caching of update packages; and
providing, via the first edge device, an indication of availability of the update packages to at least a portion of the plurality of edge devices, wherein the update packages are relevant to the portion of the plurality of edge devices;
controlling, via the first edge device, hardware security features of the second edge device;
configuring, via the first edge device, a software update package for the second edge device, the software update package comprising a plurality of different software updates; and
deploying, via the first edge device, one or more deployment management tools to manage the application on the second edge device.

14. The media of claim 13, wherein providing the remote upgrades for the application comprises providing the remote upgrades to at least one of a basic input/output system (BIOS), a boot loader, an operating system (OS), a software application, or a system kernel.

15. The media of claim 13, wherein providing the remote upgrades for the application comprises providing reliability features comprising at least one of retries, fail-over strategies, encrypting, signature validation, or integrity validation.

16. The media of claim 13, wherein deploying the one or more deployment management tools to manage the application comprises deploying the application on the second edge device or removing the application on the second edge device.

17. The media of claim 13, wherein the processing circuit is further configured to:

receive instructions from a user interface; and adjust the software update package on an instance-by-instance basis based on the received instructions.

* * * * *